(12) United States Patent
Xu et al.

(10) Patent No.: US 11,365,964 B2
(45) Date of Patent: Jun. 21, 2022

(54) STITCHING-MEASUREMENT DEVICE AND STITCHING-MEASUREMENT METHOD

(71) Applicant: The Institute of Optics and Electronics, The Chinese Academy of Sciences, Sichuan (CN)

(72) Inventors: Fuchao Xu, Chengdu (CN); Xin Jia, Chengdu (CN); Dachun Gan, Chengdu (CN); Tingwen Xing, Chengdu (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 0 days.

(21) Appl. No.: 16/626,864

(22) PCT Filed: Dec. 5, 2018

(86) PCT No.: PCT/CN2018/119375
§ 371 (c)(1),
(2) Date: Dec. 26, 2019

(87) PCT Pub. No.: WO2020/107508
PCT Pub. Date: Jun. 4, 2020

(65) Prior Publication Data
US 2021/0278201 A1 Sep. 9, 2021

(30) Foreign Application Priority Data

Nov. 28, 2018 (CN) .......................... 201811434724.1

(51) Int. Cl.
*G01B 11/02* (2006.01)
*G01B 11/24* (2006.01)
*G01B 9/02* (2022.01)

(52) U.S. Cl.
CPC ...... *G01B 11/2441* (2013.01); *G01B 9/02049* (2013.01)

(58) Field of Classification Search
CPC ............ G01B 11/2441; G01B 9/02049; G01B 9/02019; G01B 9/02039; G01B 2290/65;
(Continued)

(56) References Cited

U.S. PATENT DOCUMENTS

| 8,274,661 B2 * | 9/2012 | Hasegawa ............ G01M 11/025 356/511 |
| 2005/0157311 A1 * | 7/2005 | Kuchel .............. G01B 9/02057 356/513 |
| 2014/0104618 A1 * | 4/2014 | Potsaid .............. G01B 9/02055 356/497 |

FOREIGN PATENT DOCUMENTS

| CN | 101013027 A | 8/2007 |
| CN | 101339008 A | 1/2009 |

(Continued)

OTHER PUBLICATIONS

Fast beam steering with full polarization control using a galvanometric optical scanner and polarization controller, Jofre et al., Opt. Express 20, 12247-12260 (Year: 2012).*

(Continued)

*Primary Examiner* — Tarifur R Chowdhury
*Assistant Examiner* — Jonathon Cook
(74) *Attorney, Agent, or Firm* — Davis Wright Tremaine LLP; Michael J. Donohue

(57) ABSTRACT

Disclosed is a stitching-measurement device adapted for performing stitching-measurement on a surface of a concave spherical lens, including: an interferometer, a reference lens, a first plane mirror, a second plane mirror, a first adjustment mechanism, a second adjustment mechanism, a concave spherical object to be measured, a motion table and a control
(Continued)

mechanism, the first plane mirror being mounted on the first adjustment mechanism configured to change a position of the first plane mirror; the second plane mirror being mounted on the second adjustment mechanism configured to change a position of the second plane mirror; the concave spherical object to be measured being placed on the motion table configured to change a position of the concave spherical object to be measured; the control mechanism communicating with the interferometer, the first adjustment mechanism, the second adjustment mechanism, and the motion table for issuing control signals, wherein by the first adjustment mechanism and the second adjustment mechanism, an included angle between the first plane mirror and the second plane mirror is adjusted in such a way that light beam incident on the concave spherical object to be measured is inclined by a first angle relative to light beam emitted from the reference lens, thereby avoiding an operation of inclining the concave spherical object to be measured during the stitching-measurement.

12 Claims, 5 Drawing Sheets

(58) Field of Classification Search
CPC .............. G01M 11/02; G01M 11/005; G01M 11/0271
See application file for complete search history.

(56) References Cited

FOREIGN PATENT DOCUMENTS

| CN | 101571383 A | 11/2009 |
|----|----|----|
| CN | 101709955 A | 5/2010 |
| CN | 103575233 A | 2/2014 |
| CN | 104374334 A | 2/2015 |
| DE | 102014118151 A1 | 6/2016 |
| JP | 6232207 B2 | 10/2017 |

OTHER PUBLICATIONS

International Search Report and Written Opinion dated Aug. 27, 2019, issued in corresponding International Patent Application No. PCT/CN2018/119375, filed Dec. 5, 2018, 9 pages.

* cited by examiner

STITCHING-MEASUREMENT DEVICE AND STITCHING-MEASUREMENT METHOD

CROSS-REFERENCE TO RELATED APPLICATION

This application is a 371 National Stage Patent Application of International Patent Application No. PCT/CN2018/119375, filed on Dec. 5, 2018, which claims priority to Chinese Patent Application No. 201811434724.1, filed on Nov. 28, 2018, in the National Intellectual Property Administration of China, the disclosures of which are incorporated herein by reference in their entirety.

FIELD OF THE INVENTION

The present application relates to an optical detection field, and relates to a device and method for performing stitching-measurement on a surface of a concave spherical lens.

BACKGROUND

A lithographic lens is a complex optical system composed of dozens of lenses. Some lens surfaces are large, making it difficult to develop corresponding standard lens. A stitching-measurement is performed by dividing a lens surface into a plurality of small sub-apertures, measuring surfaces of the sub-apertures one by one, and then combining the surfaces of the sub-apertures into a surface of the whole lens by an algorithm. In a related art, an automatic stitching interferometer is proposed, which has realized automatic stitching-measurement of optical elements. However, such a stitching interferometer has low detection precision, and is only used as a process detection instrument in a precise machining of the lens. The most important reason for low precision is that during the stitching-measurement, an outer annular portion of the object to be measured is required to be inclined by an angle so as to match a state of the standard lens. This incline will deform the object to be measured, and deformation amount generated by the deformation is directly incorporated into the measurement result, so that the measurement may not be performed with high precision. Therefore, it is desired for an improved stitching-measurement device.

SUMMARY OF THE INVENTION

According to an aspect of the present disclosure, there is provided a stitching-measurement device adapted for performing stitching-measurement on a surface of a concave spherical lens, including: an interferometer, a reference lens, a first plane mirror, a second plane mirror, a first adjustment mechanism, a second adjustment mechanism, a concave spherical object to be measured, a motion table and a control mechanism, the first plane mirror being mounted on the first adjustment mechanism configured to change a position of the first plane mirror; the second plane mirror being mounted on the second adjustment mechanism configured to change a position of the second plane mirror; the concave spherical object to be measured being placed on the motion table configured to change a position of the concave spherical object to be measured; the control mechanism communicating with the interferometer, the first adjustment mechanism, the second adjustment mechanism, and the motion table for issuing control signals, wherein by the first adjustment mechanism and the second adjustment mechanism, an included angle between the first plane mirror and the second plane mirror is adjusted in such a way that light beam incident on the concave spherical object to be measured is inclined by a first angle relative to light beam emitted from the reference lens, thereby avoiding an operation of inclining the concave spherical object to be measured during the stitching-measurement.

According to an exemplary embodiment of the present disclosure, the first adjustment mechanism is configured to translate the first plane mirror in a first direction, a second direction, and a third direction and rotate the first plane mirror around the second direction, wherein the first direction, the second direction, and the third direction are perpendicular to one another; the second adjustment mechanism is configured to translate the second plane mirror in the first direction, the second direction, and the third direction and rotate the second plane mirror around the second direction; and the motion table is configured to translate the concave spherical object to be measured in the first direction and the third direction and rotates the concave spherical object to be measured around the third direction.

According to an exemplary embodiment of the present disclosure, when measuring an outer annular sub-aperture of the concave spherical object to be measured, the first adjustment mechanism and the second adjustment mechanism are configured to adjust the positions of the first plane mirror and the second plane mirror, respectively, according to the control signals issued by the control mechanism, so that the included angle between the first plane mirror and the second plane mirror is adjusted to be a second angle which is half of the first angle; and the motion table is configured to adjust the position of the concave spherical object to be measured according to the control signals issued by the control mechanism, so that a spherical center of the concave spherical object to be measured is moved to a first focus formed by a focus of the reference lens being reflected via the adjusted first and second plane mirrors.

According to an exemplary embodiment of the present disclosure, the first plane mirror is adjusted to be close to the focus of the reference lens and substantially perpendicular to edge light beam emitted from the reference lens.

According to an exemplary embodiment of the present disclosure, the second plane mirror is adjusted to reflect all of the light beams reflected by the first plane mirror onto the concave spherical object to be measured.

According to an exemplary embodiment of the present disclosure, the second plane mirror is adjusted not to block measuring light beam incident onto the first plane mirror.

According to an exemplary embodiment of the present disclosure, when measuring a central sub-aperture of the concave spherical object to be measured, the motion table is configured to adjust the position of the concave spherical object to be measured according to the control signals issued by the control mechanism, so that the spherical center of the concave spherical object to be measured coincides with the focus of the reference lens; and the first adjustment mechanism and the second adjustment mechanism are configured to adjust the positions of the first plane mirror and the second plane mirror, respectively, according to the control signals issued by the control mechanism, so that the first plane mirror and the second plane mirror leave the optical path.

According to an exemplary embodiment of the present disclosure, the first plane mirror and the second plane mirror are respectively adjusted so as to be located at two sides of the optical path, or at the same side of the optical path.

According to another aspect of the present disclosure, there is provided a stitching-measurement method using the stitching-measurement device according to any one of above embodiments, including: Step (1): according to parameters of the reference lens and the concave spherical object to be measured, calculating the number of sub-apertures and positions of the sub-apertures, the first angle and an included angle between adjacent outer annular sub-apertures, in order that the concave spherical object to be measured is completely covered by the sub-apertures, wherein the first angle is the angle by which the measuring light beam is inclined when measuring an outer annular sub-aperture; Step (2): according to the control signals issued by the control mechanism, adjusting the position of the concave spherical object to be measured by the motion table, so that the spherical center of the concave spherical object to be measured coincides with the focus of the reference lens; and according to the control signals issued by the control mechanism, adjusting the positions of the first plane mirror and the second plane mirror by the first adjustment mechanism and the second adjustment mechanism, respectively, so that the first plane mirror and the second plane mirror leave the optical path, and then controlling the interferometer by the control mechanism to measure the surface of the central sub-aperture; Step (3): according to the control signals issued by the control mechanism, adjusting the positions of the first plane mirror and the second plane mirror by the first adjustment mechanism and the second adjustment mechanism, respectively, so as to adjust the included angle between the first plane mirror and the second plane mirror, so that the light beam incident on the concave spherical object to be measured is inclined by the first angle relative to the light beam emitted from the reference lens; and according to the control signals issued by the control mechanism, adjusting the position of the concave spherical object to be measured by the motion table, so as to move the spherical center of the concave spherical object to be measured to a first focus formed by a focus of the reference lens being reflected via the adjusted first and second plane mirrors, and then controlling the interferometer by the control mechanism to measure the surface of a first outer annular sub-aperture; and Step (4): according to the control signals issued by the control mechanism, sequentially rotating, by the motion table, the concave spherical object to be measured by the included angle between the adjacent outer annular sub-apertures around a direction perpendicular to a plane where the motion table is located, and controlling the interferometer by the control mechanism to sequentially measure the surfaces of the outer annular sub-apertures until all of the outer annular sub-apertures are measured.

According to an exemplary embodiment of the present disclosure, in the step (3), the included angle between the first plane mirror and the second plane mirror is adjusted to be a second angle which is half of the first angle.

According to an exemplary embodiment of the present disclosure, in the step (3), the first plane mirror is adjusted to be close to the focus of the reference lens and substantially perpendicular to edge light beam emitted from the reference lens.

According to an exemplary embodiment of the present disclosure, in the step (3), the second plane mirror is adjusted to reflect all of the light beams reflected by the first plane mirror onto the concave spherical object to be measured.

According to an exemplary embodiment of the present disclosure, in the step (3), the second plane mirror is adjusted not to block measuring light beam incident onto the first plane mirror.

Compared with the technology in relevant art, the present disclosure has advantages in that:

1) in stitching-measurement according to the present disclosure, it not necessary for the concave spherical object to be measured to be inclined, so as to avoiding deformation error due to the operation of inclining the concave spherical object to be measured, thereby achieving high-precision stitching detection; and 2) in stitching-measurement according to the present disclosure, the avoidance of operation of inclining the concave spherical object to be measured lowers the design difficulty in tooling the concave spherical object to be measured.

BRIEF DESCRIPTION OF THE DRAWINGS

The present application will be described in further detail with reference to accompanying schematic drawings in which.

DETAILED DESCRIPTION OF PREFERRED EMBODIMENTS OF THE INVENTION

Figure 1:
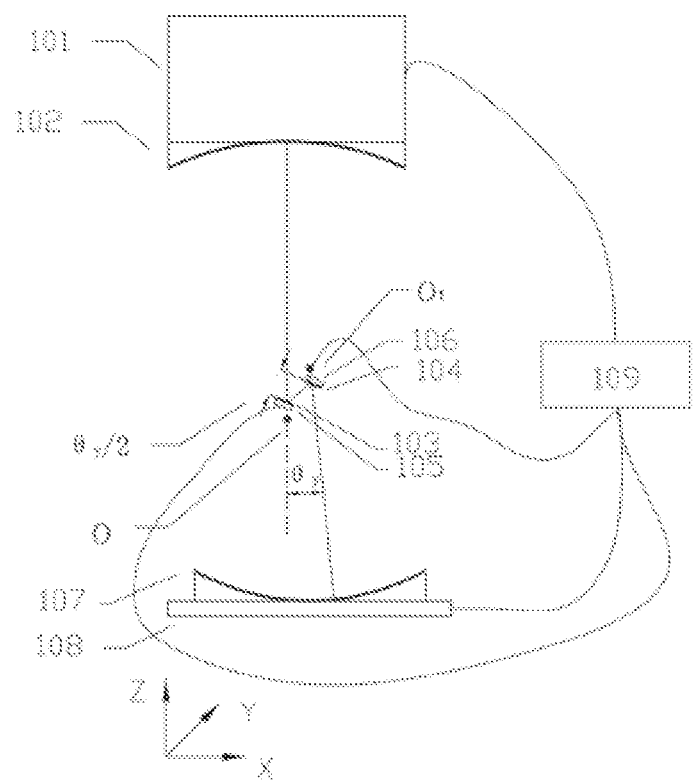
FIG. 1 is a schematic diagram of a stitching-measurement device according to an embodiment of the present disclosure in a case where an outer annular sub-aperture of a lens to be measured is measured.

As shown in FIG. 1, a stitching-measurement device includes an interferometer 101, a reference lens, a plane mirror 103, a plane mirror 104, an adjustment mechanism 105, an adjustment mechanism 106, a concave spherical object 107 to be measured, a motion table 108, and a control mechanism. As shown in FIG. 1, the reference lens includes a spherical standard lens 102 and the control mechanism includes a computer 109. As shown in FIG. 1, the plane mirror 103 is mounted on the adjustment mechanism 105. The adjustment mechanism 105 is configured to translate the plane mirror 103 in X, Y, and Z directions and rotate the plane mirror 103 around the Y direction, wherein the XYZ coordinate system is the coordinate system of the adjustment mechanism 105. The plane mirror 104 is mounted on the adjustment mechanism 106. The adjustment mechanism 106 is configured to translate the plane mirror 104 in the X, Y, and Z directions and rotate the plane mirror 104 around the Y direction, wherein the XYZ coordinate system is the coordinate system of the adjustment mechanism 106. The concave spherical object 107 to be measured is installed on the motion table 108. The motion table 108 is configured to translate the concave spherical object 107 to be measured in the X and Z directions and rotate it around the Z direction, wherein the XYZ coordinate system is the coordinate system of the motion table 108. The computer 109 communicates with the interferometer 101, the adjustment mechanism 105, the adjustment mechanism 106, and the motion table 108 for issuing control signals. In an embodiment, when the outer annular sub-aperture needs to be measured, the adjustment mechanisms 105 and 106 are adjusted such that the plane mirrors 103 and 104 have a certain included angle therebetween. This adjustment results in that the light beam incident on the concave spherical object 107 to be measured is inclined by an angle θy with respect to the light beam emitted from the spherical standard lens 102.

A stitching-measurement method using the stitching-measurement device according to an embodiment of the present disclosure will be described below with reference to FIGS. 1-6.

Step (1): Designing Positions and Optical Paths of the Aperture

In this step, according to parameters of the spherical standard lens 102 and the concave spherical object 107 to be measured, the number of the sub-apertures and a position of each sub-aperture are designed, and the angle θy by which the measuring light beam is inclined when measuring the outer annular sub-aperture and an included angle 9z of adjacent outer annular sub-apertures are calculated, in order that the concave spherical object 107 to be measured is completely covered by the sub-apertures.

Figure 2:
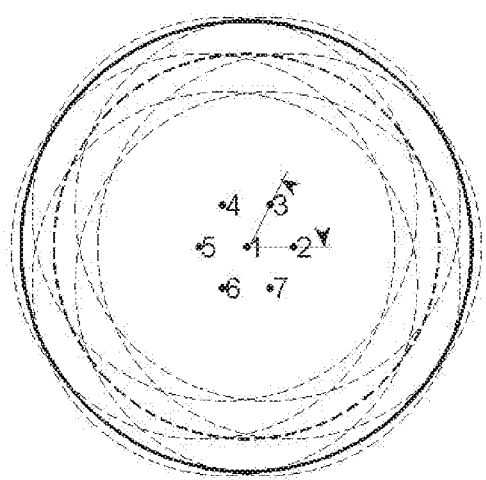
FIG. 2 is a schematic diagram of a sub-aperture layout according to an embodiment of the present disclosure.

In an embodiment, as shown in FIG. 2, a curvature radius of the spherical standard lens 102 is 354 mm, and its aperture is 300 mm; and a curvature radius of the concave spherical object 107 to be measured is 296 mm, and its aperture is 293 mm. The sub-apertures are designed as follow: there are seven sub-apertures with one central sub-aperture and six outer annular sub-apertures; and the included angle θz between the adjacent outer annular sub-apertures is 60 degrees, and the inclined angle θy of the measuring light beam is 6 degrees. In FIG. 2, a thick solid line represents the concave spherical object 107 to be measured, a thick dotted line represents a region corresponding to a sub-aperture at the center, thin dotted lines represent regions corresponding to sub-apertures at the outer annulus, and a black dot represents center of each sub-aperture.

Step (2): Measuring a Surface of the Central Sub-Aperture

Figure 5:
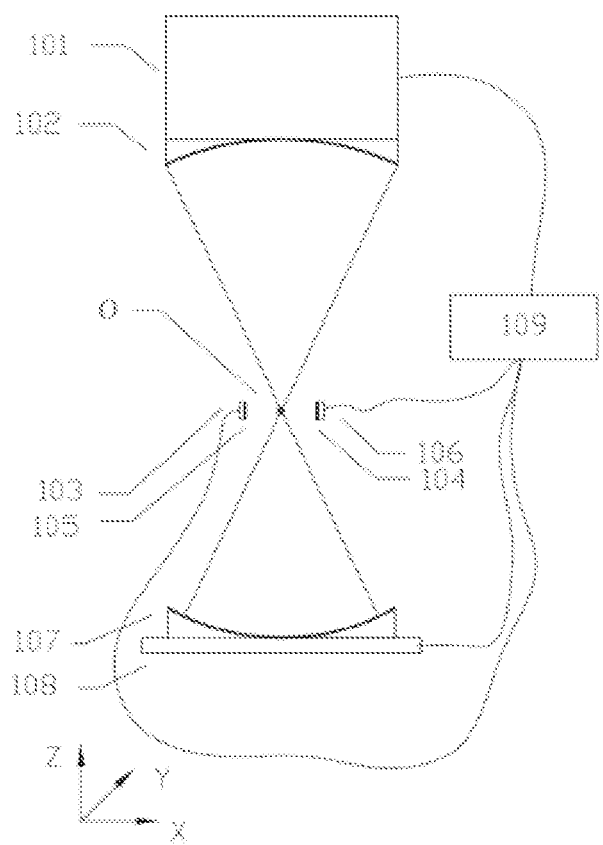
FIG. 5 is a schematic diagram of a stitching-measurement device according to an embodiment of the present disclosure in a case where a central sub-aperture is measured.

In this step, a measurement platform as shown in FIG. 5 is set up; the motion table 108 is controlled by the computer 109 to adjust the position of the concave spherical object 107 to be measured, so that the focus O of the spherical standard lens 102 coincides with the spherical center of the concave spherical object 107 to be measured; the adjustment mechanisms 105 and 106 are controlled by the computer 109 to adjust the plane mirrors 103 and 104 to leave the optical path; and then the interferometer 101 is controlled by the computer 109 to measure the surface of the central sub-aperture.

As shown in FIG. 5, the computer 109 is configured to control the adjustment mechanism 105 to adjust the plane mirror 103 to a left side of the optical path, and the computer 109 is also configured to control the adjustment mechanism 106 to adjust the plane mirror 104 to a right side of the optical path. In a further embodiment, the computer 109 is configured to control the adjustment mechanisms 105 and 106 to adjust the plane mirrors 103 and 104 both to the left or right side of the optical path. In a further embodiment, the computer 109 is configured to control the adjustment mechanism 105 to adjust the plane mirror 103 to the right side of the optical path, and control the adjustment mechanism 106 to adjust the plane mirror 104 to the left side of the light path.

Figure 6:
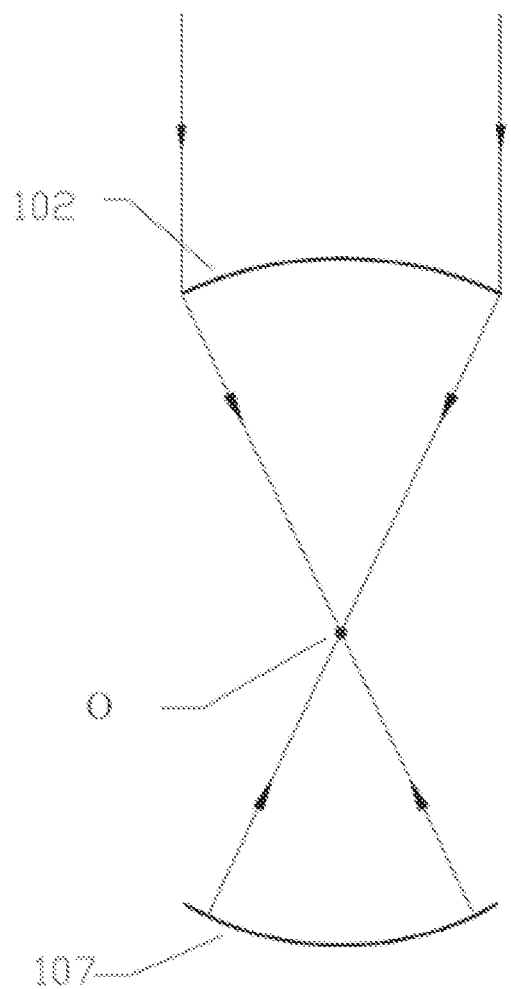
FIG. 6 is a schematic diagram of an optical path of the stitching-measurement device as shown in FIG. 5.

FIG. 6 is a schematic diagram of an optical path of the stitching-measurement device as shown in FIG. 5. As shown in FIG. 6, measuring light beam emitted from the spherical standard lens 102 is incident on the concave spherical object 107 to be measured and then returns along the original optical path. The focus O of the measuring light beam coincides with the spherical center of the concave spherical object 107 to be measured.

Step (3): Measuring a Surface of a First Outer Annular Sub-Aperture

In this step, as shown in FIG. 1, the adjustment mechanisms 105 and 106 are controlled by the computer 109 to adjust the positions of the plane mirrors 103 and 104 so as to adjust the included angle between the plane mirrors 103 and 104, such that the light beam incident on the concave spherical object 107 to be measured is inclined by an angle θy with respect to the light beam emitted from the spherical standard lens 102; the motion table 108 is then controlled by the computer 109 to adjust the position of the object 107 to be measured, so that the spherical center of the object 107 to be measured is moved to a focus O1, wherein the focus O1 is formed by the focus O of the spherical standard lens 102 being reflected via the adjusted plane mirrors 103 and 104, that's to say, the focus O1 is formed by converging the light beams emitted from the spherical standard lens 102 reflected by the adjusted plane mirrors 103 and 104; and then, the interferometer 101 is controlled by the computer 109 to measure the surface of the first outer annular sub-aperture.

In an embodiment, as shown in FIG. 1, the computer 109 is configured to control the adjustment mechanism 105 to adjust the position of the plane mirror 103, so that the plane mirror 103 is close to the focus O and is substantially perpendicular to edge light beam emitted from the spherical standard lens 102. This allows the size of the plane mirror 104 to be minimized. The computer 109 is configured to control the adjustment mechanism 106 to adjust the position of the plane mirror 104, so that the included angle between the plane mirror 104 and the plane mirror 103 is θy/2 degrees. As shown in FIG. 1, the included angle between the plane mirror 104 and the plane mirror 103 is 3 degrees. In an embodiment, the plane mirror 104 is positioned in such a way not to block the measuring light beam incident on the plane mirror 103. In an embodiment, the plane mirror 104 is positioned in such a way to allow all of the light beams reflected by the plane mirror 103 to be incident on the concave spherical object 107 to be measured.

Figure 3:
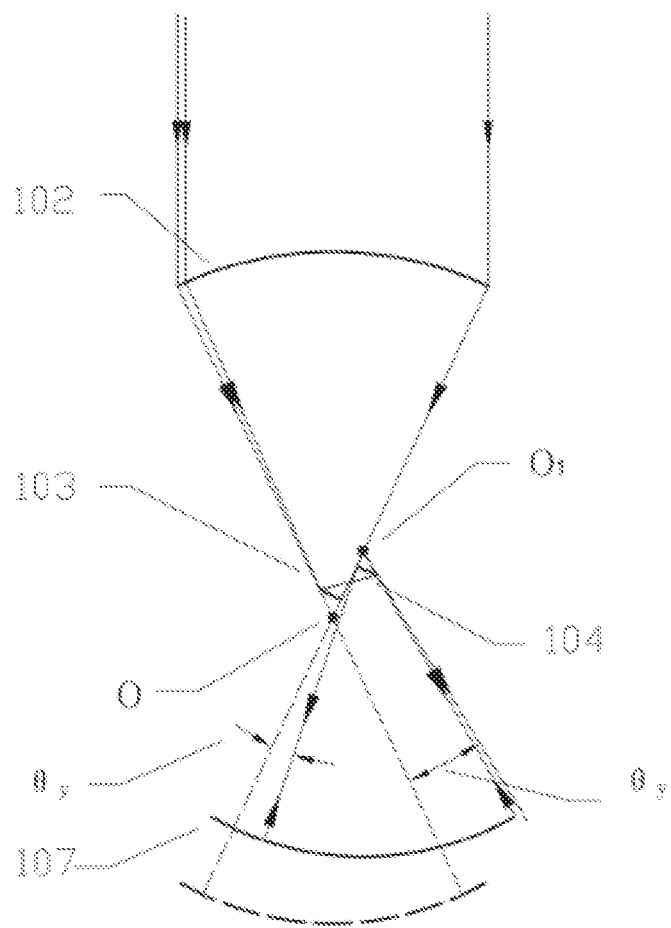
FIG. 3 is a schematic diagram of an optical path of the stitching-measurement device as shown in FIG. 1.
Figure 4:
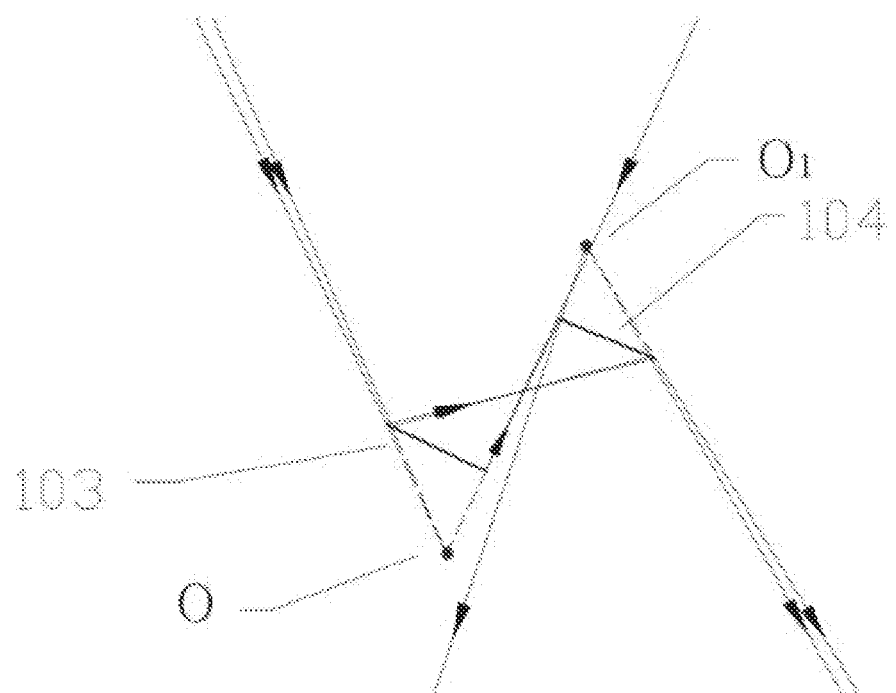
FIG. 4 is a partial enlarged view of the optical path as shown in FIG. 3.

FIG. 3 is a schematic diagram of an optical path of the stitching-measurement device as shown in FIG. 1; and FIG. 4 is a partial enlarged view of the optical path as shown in FIG. 3. As shown in FIGS. 3 and 4, the measuring light beam emitted from the spherical standard lens 102 is reflected sequentially by the plane mirrors 103 and 104, and then is incident on the concave spherical object 107 to be measured at the inclined angle θy relative to the measuring light beam emitted from the spherical standard lens 102. Then the measuring light beam returns along the original optical path. In this way, the measuring light beam is inclined by adjusting the included angle between the two plane mirrors. Consequently, this avoids the deformation error caused by inclining the object to be measured, achieves high-precision stitching detection, and reduces design difficulty in tooling the object to be measured.

Step (4): Sequentially Measuring Surfaces of Other Outer Annular Sub-Apertures

In this step, the motion table 108 is controlled by the computer 109 so that the object 107 to be measured is sequentially rotated by the included angle θz between the adjacent outer annular sub-apertures around the Z-axis direction; and then the interferometer 101 is controlled by the computer 109 to sequentially measure the surfaces of the outer annular sub-apertures until all of the outer annular sub-apertures are measured. In the illustrated embodiment, the object 107 to be measured is sequentially rotated by 60 degrees around the Z-axis direction.

The present disclosure does not elaborate a part of the well-known techniques belonging to those skilled in the art.

It should be appreciated for those skilled in this art that the above embodiments are intended to be illustrated. Modifications may be made to the above embodiments by those skilled in this art, and structures described in various embodiments may be freely combined with each other without conflicting in configuration or principle.

Although the present disclosure is described in combination with the accompanying drawings, the embodiments disclosed in the drawings are intended to exemplarily illustrate the preferred embodiments of the present disclosure, and should not be construed as being limited to the present disclosure.

Although several exemplary embodiments of the general inventive concept have been shown and described, it would be appreciated by those skilled in the art that modifications may be made in these embodiments without departing from the principles and spirit of the disclosure, the scope of which is defined in the claims and their equivalents.

It should be noted that the word "comprise" or "include" should be understood as not excluding other element or step, and the word "a" or "an" should be understood as not excluding plural of said elements or steps, unless such exclusion is explicitly stated.

What is claimed is:

1. A stitching-measurement device adapted for performing stitching-measurement on a surface of a concave spherical lens, comprising:
    an interferometer, a reference lens, a first plane mirror, a second plane mirror, a first adjustment mechanism, a second adjustment mechanism, a concave spherical object to be measured, a motion table, and a control mechanism;
    the first plane mirror being mounted on the first adjustment mechanism configured to change a position of the first plane mirror;
    the second plane mirror being mounted on the second adjustment mechanism configured to change a position of the second plane mirror;
    the concave spherical object to be measured being placed on the motion table configured to change a position of the concave spherical object to be measured;
    the control mechanism communicating with the interferometer, the first adjustment mechanism, the second adjustment mechanism, and the motion table for issuing control signals,
    wherein by the first adjustment mechanism and the second adjustment mechanism, an included angle between the first plane mirror and the second plane mirror is adjusted in such a way that light beam incident on the concave spherical object to be measured is inclined by a first angle relative to light beam emitted from the reference lens, thereby avoiding an operation of inclining the concave spherical object to be measured during the stitching-measurement; and
    wherein the first adjustment mechanism is configured to translate the first plane mirror in a first direction, a second direction, and a third direction and rotate the first plane mirror around the second direction, wherein the first direction, the second direction, and the third direction are perpendicular to one another;
    the second adjustment mechanism is configured to translate the second plane mirror in the first direction, the second direction, and the third direction and rotate the second plane mirror around the second direction; and
    the motion table is configured to translate the concave spherical object to be measured in the first direction and the third direction and rotate the concave spherical object to be measured around the third direction.

2. The stitching-measurement device according to claim 1, wherein when measuring an outer annular sub-aperture of the concave spherical object to be measured,
    the first adjustment mechanism and the second adjustment mechanism are configured to adjust the positions of the first plane mirror and the second plane mirror, respectively, according to the control signals issued by the control mechanism, so that the included angle between the first plane mirror and the second plane mirror is adjusted to be a second angle which is half of the first angle; and
    the motion table is configured to adjust the position of the concave spherical object to be measured according to the control signals issued by the control mechanism, so that a spherical center of the concave spherical object to be measured is moved to a first focus formed by a focus of the reference lens being reflected via the adjusted first and second plane mirrors.

3. The stitching-measurement device according to claim 2, wherein the first plane mirror is adjusted to be close to the focus of the reference lens and substantially perpendicular to edge light beam emitted from the reference lens.

4. The stitching-measurement device according to claim 3, wherein the second plane mirror is adjusted to reflect all of the light beams reflected by the first plane mirror onto the concave spherical object to be measured.

5. The stitching-measurement device according to claim 4, wherein the second plane mirror is adjusted not to block measuring light beam incident onto the first plane mirror.

6. The stitching-measurement device according to claim 1, wherein when measuring a central sub-aperture of the concave spherical object to be measured,
    the motion table is configured to adjust the position of the concave spherical object to be measured according to the control signals issued by the control mechanism, so that a spherical center of the concave spherical object to be measured coincides with a focus of the reference lens; and
    the first adjustment mechanism and the second adjustment mechanism are configured to adjust the positions of the first plane mirror and the second plane mirror, respectively, according to the control signals issued by the control mechanism, so that the first plane mirror and the second plane mirror leave the optical path.

7. The stitching-measurement device according to claim 6, wherein the first plane mirror and the second plane mirror are respectively adjusted so as to be located at two sides of the optical path, or at the same side of the optical path.

8. A stitching-measurement method using the stitching-measurement device according to claim 1, comprising:
    Step (1): according to parameters of the reference lens and the concave spherical object to be measured, calculating the number of sub-apertures and positions of the sub-apertures, the first angle and an included angle between adjacent outer annular sub-apertures, in order that the concave spherical object to be measured is completely covered by the sub-apertures, wherein the first angle is the angle by which the measuring light beam is inclined when measuring an outer annular sub-aperture;

Step (2): according to the control signals issued by the control mechanism, adjusting the position of the concave spherical object to be measured by the motion table, so that the spherical center of the concave spherical object to be measured coincides with a focus of the reference lens; and according to the control signals issued by the control mechanism, adjusting the positions of the first plane mirror and the second plane mirror by the first adjustment mechanism and the second adjustment mechanism, respectively, so that the first plane mirror and the second plane mirror leave the optical path, and then controlling the interferometer by the control mechanism to measure the surface of the central sub-aperture;

Step (3): according to the control signals issued by the control mechanism, adjusting the positions of the first plane mirror and the second plane mirror by the first adjustment mechanism and the second adjustment mechanism, respectively, so as to adjust the included angle between the first plane mirror and the second plane mirror, so that the light beam incident on the concave spherical object to be measured is inclined by the first angle relative to the light beam emitted from the reference lens; and according to the control signals issued by the control mechanism, adjusting the position of the concave spherical object to be measured by the motion table, so as to move the spherical center of the concave spherical object to be measured to a first focus formed by a focus of the reference lens being reflected via the adjusted first and second plane mirrors, and then controlling the interferometer by the control mechanism to measure a surface of a first outer annular sub-aperture; and Step (4): according to the control signals issued by the control mechanism, sequentially rotating, by the motion table, the concave spherical object to be measured by the included angle between the adjacent outer annular sub-apertures around a direction perpendicular to a plane where the motion table is located, and controlling the interferometer by the control mechanism to sequentially measure the surfaces of the outer annular sub-apertures until all of the outer annular sub-apertures are measured.

9. The stitching-measurement method according to claim 8, wherein in the step (3), the included angle between the first plane mirror and the second plane mirror is adjusted to be a second angle which is half of the first angle.

10. The stitching-measurement method according to claim 9, wherein in the step (3), the first plane mirror is adjusted to be close to the focus of the reference lens and substantially perpendicular to edge light beam emitted from the reference lens.

11. The stitching-measurement method according to claim 10, wherein in the step (3), the second plane mirror is adjusted to reflect all of the light beams reflected by the first plane mirror onto the concave spherical object to be measured.

12. The stitching-measurement method according to claim 11, wherein in the step (3), the second plane mirror is adjusted not to block measuring light beam incident onto the first plane mirror.

* * * * *